United States Patent [19]

Carlson

[11] 4,375,025
[45] Feb. 22, 1983

[54] LASER STRIP MARKER

[75] Inventor: William J. Carlson, Erie, Pa.

[73] Assignee: Automated Industrial Systems, Inc., Fairview, Pa.

[21] Appl. No.: 161,137

[22] Filed: Jun. 19, 1980

[51] Int. Cl.³ .............................................. B23K 27/00
[52] U.S. Cl. ...................... 219/121 LH; 219/121 LB; 219/121 LY; 219/121 LU
[58] Field of Search ..... 219/121 L, 121 LM, 121 LB, 219/121 LH, 121 LX, 121 LY, 121 LU, 121 LZ; 198/461

[56] References Cited

U.S. PATENT DOCUMENTS

| | | | |
|---|---|---|---|
| 2,612,852 | 10/1952 | Morrison | 198/461 X |
| 2,662,633 | 12/1953 | Kingsley | 198/461 X |
| 3,325,819 | 6/1967 | Fraser | 219/121 LY X |
| 3,587,674 | 6/1971 | Adkin | 198/461 X |
| 3,622,742 | 11/1971 | Cohen et al. | 219/121 LB X |
| 3,634,646 | 1/1972 | Berger | 219/121 LB X |
| 3,799,657 | 3/1974 | Dager et al. | 219/121 LU X |
| 4,115,683 | 9/1978 | Clark et al. | 219/121 LM X |
| 4,135,077 | 1/1979 | Wills | 219/121 L |
| 4,141,456 | 2/1979 | Hart | 219/121 LY X |
| 4,143,261 | 3/1979 | Eckart et al. | 219/121 LY X |
| 4,190,146 | 2/1980 | Knuchel | 198/461 X |

Primary Examiner—C. L. Albritton
Attorney, Agent, or Firm—Charles L. Lovercheck; Wayne L. Lovercheck; Dale R. Lovercheck

[57] ABSTRACT

The system disclosed herein is a high speed method and apparatus for presenting parts to a laser beam for marking the parts. The apparatus is capable of feeding at adjustable rates, various sizes and configuration of parts in strip form such as electronic component, a die cut strip or on lead frames.

6 Claims, 5 Drawing Figures

FIG 4
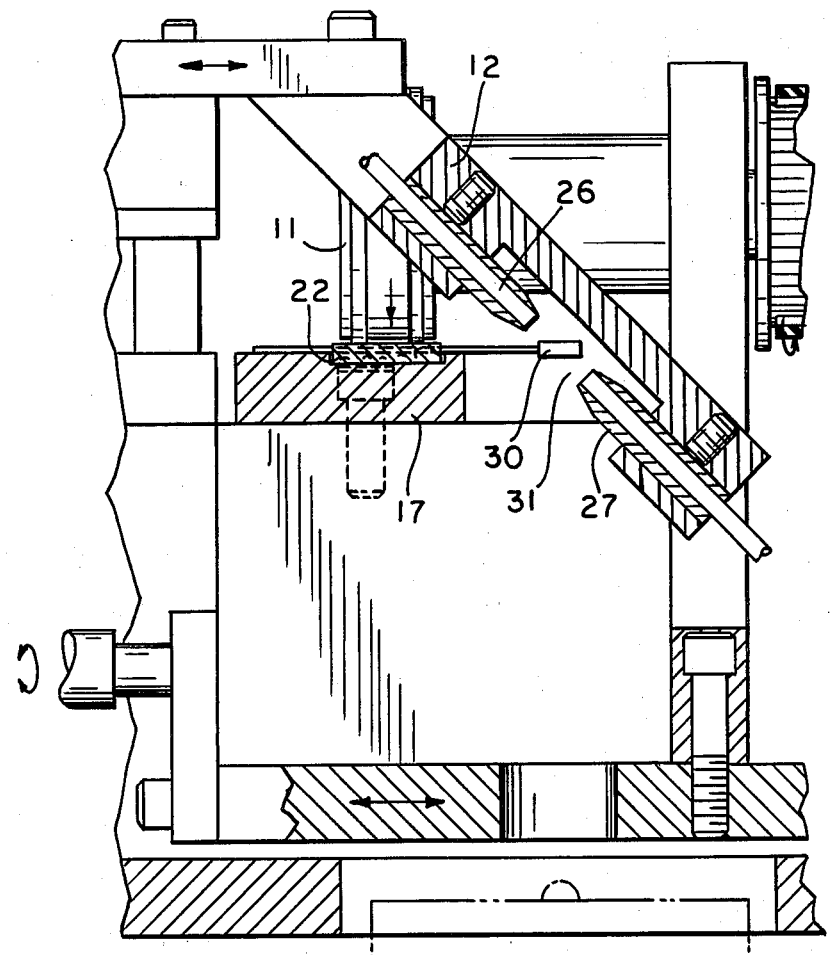
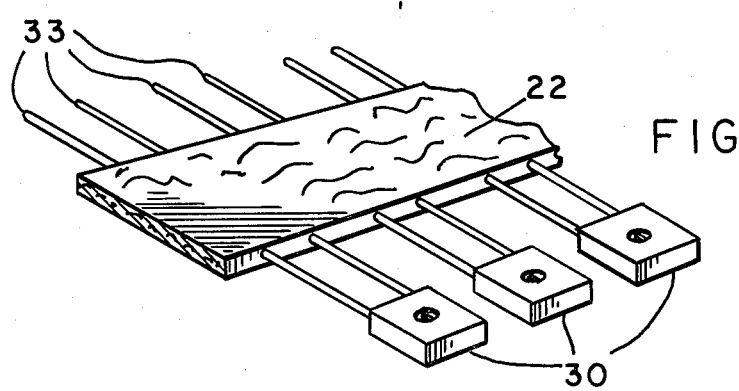
FIG 5

LASER STRIP MARKER

GENERAL STATEMENT

The invention relates to marking devices and more particularly to marking systems using lasers as the marking instruments.

GENERAL DESCRIPTION OF THE OPERATION

The strip may be manually fed under drive rail 11 and driven through the photo electric eye mounted on blocks 12. The photoelectric eyes detect the leading edges of the components and gives the laser a signal to fire. The location of the mark may be adjusted by means of the micrometer adjustment 13.

The strip then continues to be driven through the laser beam area by drive wheel 14 into engagement with drive wheel 16, which rotates at a higher rpm than wheel 14 and drives the completed strip clear of the mechanism.

The guide rail 17 is mounted on two slides 18 and the mark is further positioned by adjustment of the micrometer barrel 19. Adjustment to detect the leading edge of different size components is accomplished by the adjustment of micrometer 20.

REFERENCE TO PRIOR ART

The marking device disclosed herein constitutes an improvement over the following U.S. Pat. Nos.:
3,463,594
3,518,925
3,622,742
3,814,895
3,816,700
3,898,417
3,925,785
3,950,095
4,050,563
4,118,619

The above patents were found in a search made on the machine.

OBJECTS OF THE INVENTION

It is an object of the invention to provide an improved marking machine for strips using lasers.

Another object of the invention is to provide an improved machine for marking electronic components.

Another object of the invention is to provide a machine that is adjustable to accomodate various sizes and configuration of parts in strip form.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 4 is an enlarged view of the photoelectric cell arrangement shown in FIG. 3.

FIG. 5 is an enlarged view of a strip having electronic devices attached to it.

DETAILED DESCRIPTION OF THE DRAWINGS

Figure 1:
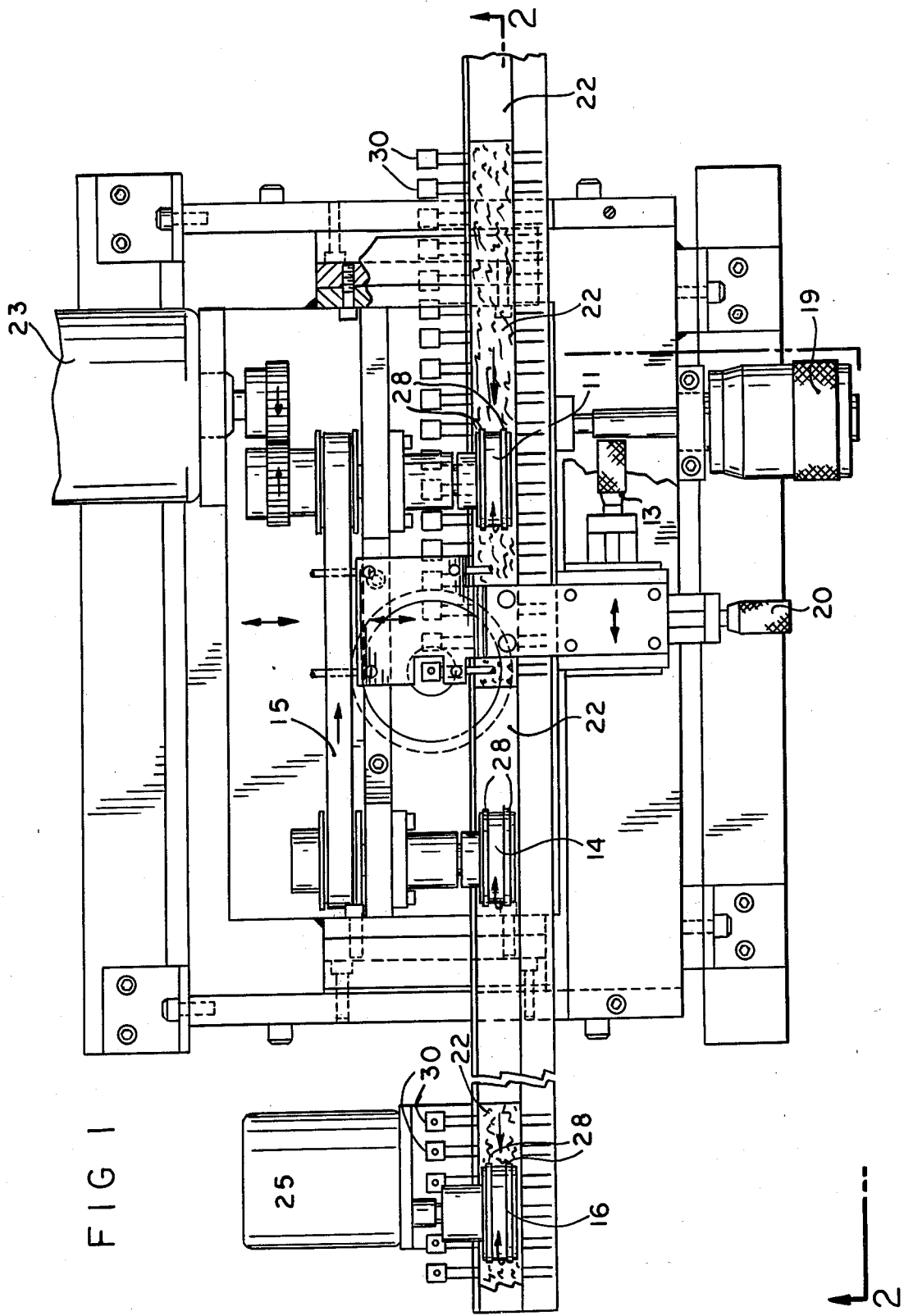
FIG. 1 is a plane view of the marking machine according to the invention.
Figure 2:
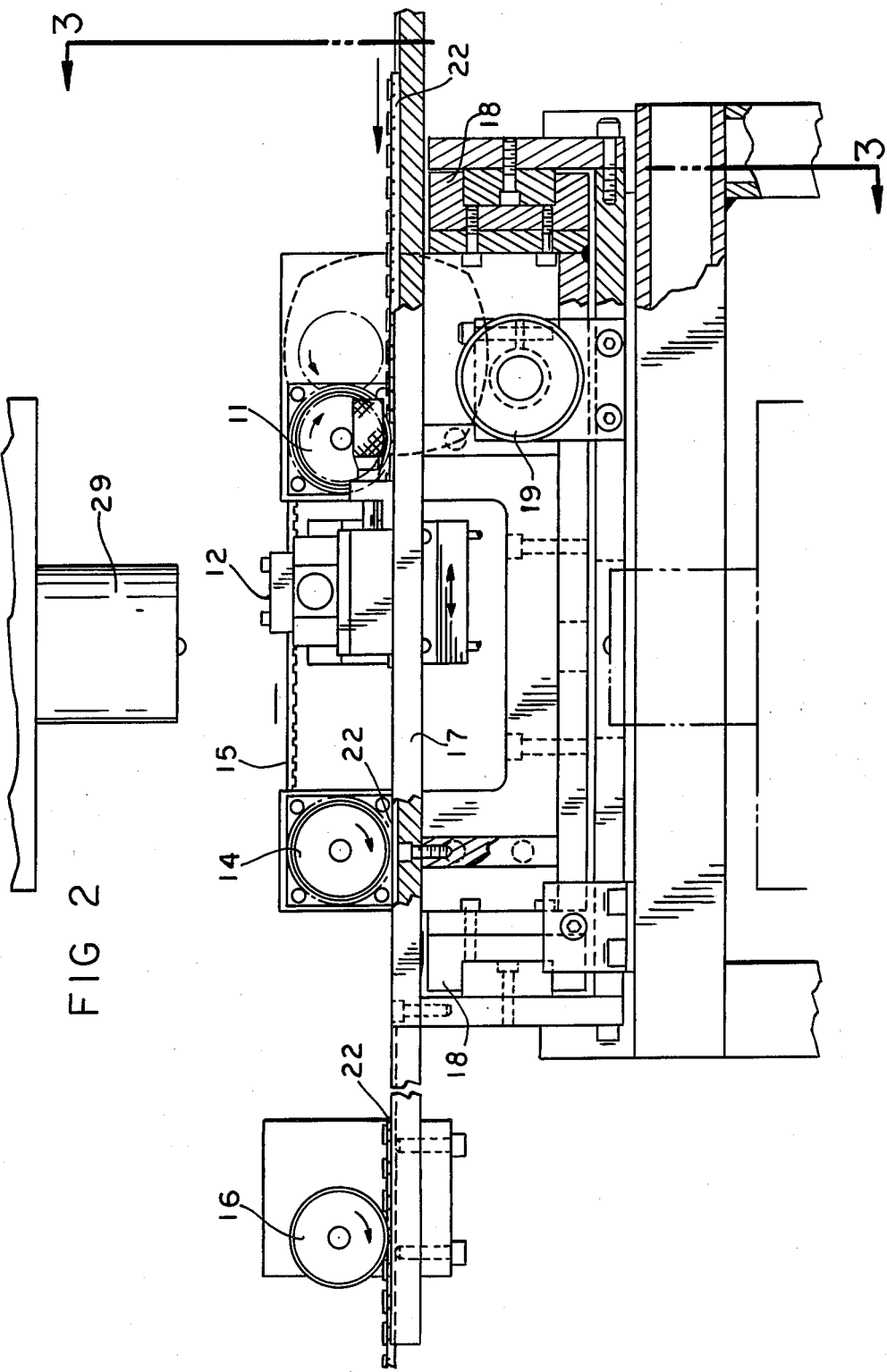
FIG. 2 is a cross-sectional view of the machine shown in FIG. 1 taken on Line 2—2 of FIG. 1.
Figure 3:
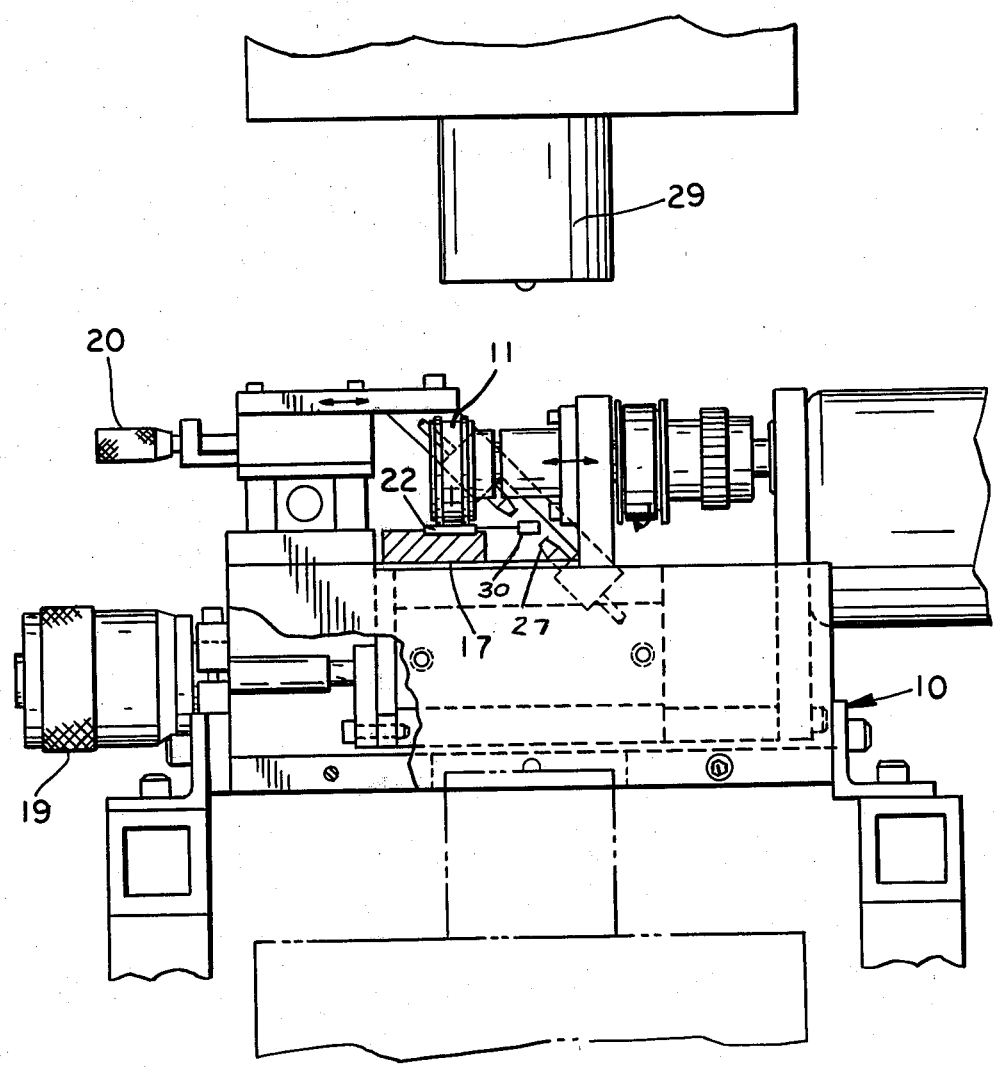
FIG. 3 is a cross-sectional view of the machine shown in FIGS. 1 and 2 taken on Line 3—3 of FIG. 2.

Now, with more particular reference to the drawings, a machine is disclosed for providing a high speed method of presenting parts to and triggering a laser beam to mark parts.

The system is capable of feeding at an adjustable rate various sizes and configuration of parts in strip form. That is, for example, electronic components or a die cut strip or on lead frames.

The strips 22 are fed along the guide rail 17, which is mounted on two slides 18. The guide rail 17 extends from one end of the machine to the other. First drive wheel 11 and second drive wheel 14 are driven by motor 23 and wheel 14 is connected to wheel 11 by geared belt 15. Third wheel 16 is driven by electric motor 25 and may be accelerated and driven at a faster rate than wheel 16. Thus, after a strip 22 passes wheel 14 it is rapidly moved away by wheel 16 from the strips driven by wheels 11 and 14.

An electric eye 26 and a light source 27 are supported on block 12. The eye and the light source could be supported either above or below the strips 22 depending on the desire of the designer.

The wheels 11, 14 and 16 each have rubber "O" rings 28 on their periphery to better engage the strips.

A laser source 29 of a type familiar to those skilled in the art is supported above the strips and each time an electronic part 30 intercepts the light beam 31 from source 27, it triggers the laser 29, which projects a beam 32 onto the electronic component 30 below it, thereby, impressing a marking on it.

The electronic components 30 have pig tail wires 33 on them which hold them to strip 22. Strips 22 are fed to the machine manually or otherwise under drive wheel 11 and driven through the photo electric eyes mounted on blocks 12. The photo electric eyes detect the leading edges of the components and gives the laser a firing signal. The location of the mark may be adjusted longitudinally by means of the micrometer adjustment 13. The strip then continues to be driven through the laser beam area by drive wheel 14 into drive wheel 16 which rotates at a higher rmp and drives the completed strip clear of the mechanism. The guide rail 17 is mounted on two slides 18 and the mark is further positioned laterally by adjustment of the micrometer barrel 19. The lateral position of the laser to leading edge of components is accomplished by the adjustment of micrometer 20.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A strip feed and marking machine comprising,
a frame 10,
a guide rail, slidable means supporting said guide rail on said frame and adapted to carry strips 22 of electrical components, a laser 29 on said frame, means on said machine to move said strips 14, 16 along said guide rail, an electric eye and a light source 27, means slidably supporting said electric eye and said light source 27 on said frame, whereby light from said source 27 to said electric eye is adapted to be intercepted by the leading edges of said electrical components 30, said electric eye being connected to said laser 29 to trigger said laser when a leading edge of a said component intercepts said light from said light source to said electric eye whereby said laser is triggered and marks a said electric component, and first micrometer means 19 connecting said guide rail to said frame for moving said guide rail in a first direction relative to said frame, a second micrometer means 20 connected to said frame and to said means slidably supporting said electric eye to adjust the position of said electric eye and light source relative to said frame in a said first direction and a third micrometer means 13 connected to said frame and to said means supporting said electric eye to adjust the position of said electric eye and light in a second direction relative to said frame.

2. The strip feed recited in claim 1 wherein said means to move said strips comprise, a first wheel, a second wheel and a third wheel, said first wheel having a periphery adapted to engage said strips before they intercept said electric eye, said second wheel having a periphery adapted to engage said strips after the leading edge passes said electric eye and said third wheel being adapted to engage said strips downstream of said second wheel.

3. The strip feed machine recited in claim 2 wherein said first wheel and said second wheel are driven in synchronism with each other and said third wheel is adapted to be driven at a different rate than said first wheel and said second wheel.

4. The strip feed machine recited in claim 1 wherein said photoelectric eye is disposed at approximately 15° to the vertical whereby a course of said electric component intercepts said photoelectric eye.

5. The strip feed and marking machine recited in claim 1 wherein said machine has feed means thereon for feeding strips supported on said guide rail, said feed means comprising a first feed means for moving said strips at a first speed and means to move said strips at a second speed faster than said first speed.

6. The strip feed machine recited in claim 5 wherein drive means comprise wheels with "O" rings on the outer periphery thereof.

* * * * *